No. 775,801. PATENTED NOV. 22, 1904.
G. A. DANIELSON.
FASTENER OR HOLDING DEVICE.
APPLICATION FILED MAY 16, 1904.
NO MODEL.

Witnesses.
C. H. Emmett
J. Murphy.

Inventor.
Gustaf A. Danielson
by Jas. H. Churchill
atty.

No. 775,801.

Patented November 22, 1904.

UNITED STATES PATENT OFFICE.

GUSTAF A. DANIELSON, OF DORCHESTER, MASSACHUSETTS, ASSIGNOR OF ONE-HALF TO CHARLES F. BAKER, OF BOSTON, MASSACHUSETTS.

FASTENER OR HOLDING DEVICE.

SPECIFICATION forming part of Letters Patent No. 775,801, dated November 22, 1904.

Application filed May 16, 1904. Serial No. 208,120. (No model.)

*To all whom it may concern:*

Be it known that I, GUSTAF A. DANIELSON, a citizen of the United States, residing in Dorchester, in the county of Suffolk and State of Massachusetts, have invented an Improvement in Fasteners or Holding Devices, of which the following description, in connection with the accompanying drawings, is a specification, like characters on the drawings representing like parts.

This invention relates to a fastener or holding device especially designed and adapted for use with money or mail bags, handkerchiefs, and like articles.

The invention has for its object to provide a simple and efficient device for the purpose specified.

Figure 2:
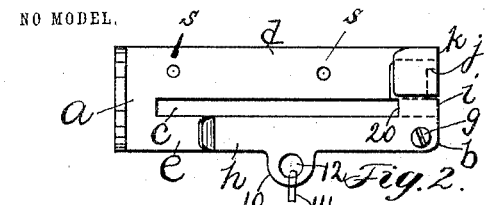
Figure 3:
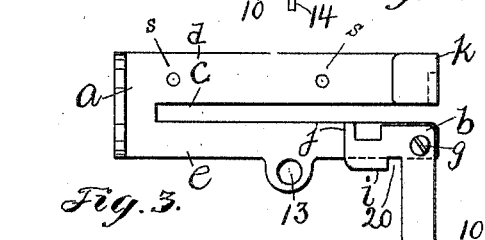
Figure 4:
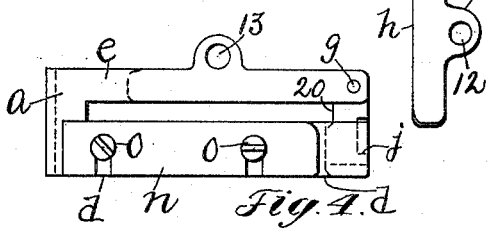
Figure 5:
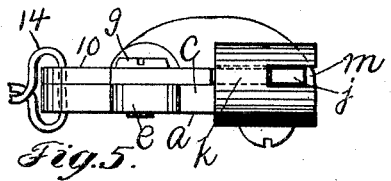
Figure 1:
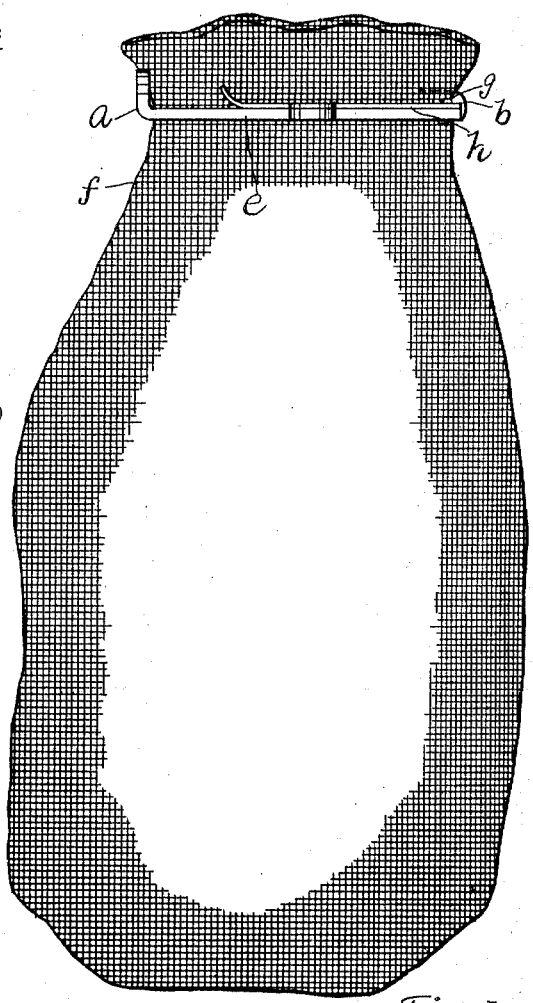
Figure 6:
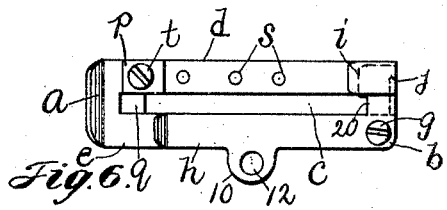
Figure 7:
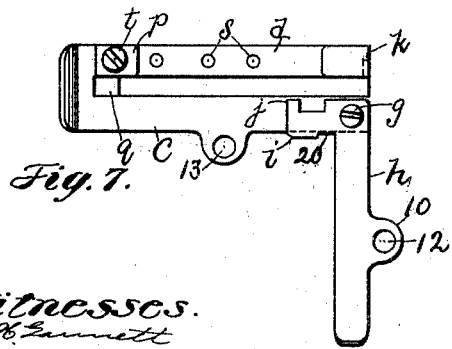
Figure 8:
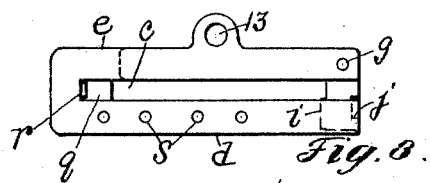
Figure 9:
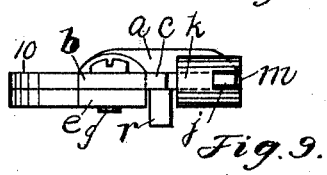

Figure 1 represents in elevation a bag provided with a fastener or holding device embodying this invention; Fig. 2, a plan view of the fastener shown in Fig. 1; Fig. 3, a plan view of the fastener shown in Fig. 2 in its open position; Fig. 4, a plan view of the fastener shown in Fig. 2 inverted; Fig. 5, an end elevation, on an enlarged scale, of the fastener shown in Fig. 2; Fig. 6, a plan view of a modified form of fastener; Fig. 7, a plan view of the fastener shown in Fig. 6 in its open position; Fig. 8, an inverted plan of the fastener shown in Fig. 6, and Fig. 9 an end elevation of the fastener shown in Fig. 6.

The fastener or holding device herein shown as embodying this invention comprises, essentially, two members $a$ $b$, which may be designated, respectively, the "holding" member and the "locking" member. The holding member $a$ may be made as herein shown and comprises a plate or bar provided with a slot $c$, extended from one end of said plate toward the other end thereof to form two arms $d$ $e$, between which the bag $f$, of cloth, leather, or other pliable material, may be inserted. The locking member $b$, as herein shown, comprises an elbow-lever pivoted at $g$ to the arm $e$ of the holding member near one end of the same, said lever comprising a substantially long arm $h$ and a substantially short arm $i$, which latter is provided with a finger $j$, which is adapted to engage an upturned portion $k$ of the arm $d$ of the holding member to lock the arms $d$ $e$ of said holding member from spreading apart at their free ends. The arm $i$ serves to close the normally open end of the slot $c$, and thereby lock the bag $f$ or other article from movement out of the said slot. The arm $i$ may be provided with a notch 20, which is adapted to register, as herein shown, with the slot $c$, and the walls of which engage the bag and serve as additional means to prevent the locking member being opened. In the present instance the arm $d$ of the holding member is made longer than the arm $e$, and the portion which projects beyond the arm $e$ is turned or folded back upon the arm $d$, and a notch $m$ (see Fig. 5) is formed in the outer edge of the bent or upturned portion of the arm $d$, which notch is entered by the finger $j$ on the arm $i$ of the locking member and which notch avoids the locking arm $i$, projecting beyond the side of the arm $d$ of the holding member.

In operation with the device as thus far described the article to be held, which is herein shown as the bag $f$, is inserted into the slot $c$ in the holding member, the locking member being at such time in its open position. (Shown in Fig. 3.) The portion of the bag near its mouth or open end is worked into the slot and is thereby creased, folded, or puckered, and when wholly inserted therein the locking member is turned from its open position (shown in Fig. 3) into its closed position, (shown in Figs. 1 and 2,) thereby closing the slot $c$ and locking the bag in its holder against movement out of the slot longitudinally thereof. The surplus cloth above the holding device or fastener, which is formed by the puckered condition of the bag, prevents the bag from being drawn down through the slot $c$ by the weight of the contents of the bag. The bag is thus closed by the holding device or fastener until the locking member is turned into its open or unlocked position. (Shown in Fig. 3.)

Provision is made for enabling the device to be used with bags or other articles of different thickness of material, and this may be accomplished by means of a bar or piece n, which is adjustably secured to one of the arms of the holding member, herein shown as the arm d, as by screws o. (See Fig. 4.)

By reference to Fig. 4 it will be seen that the adjustable device or bar n may be moved toward the arm e of the holding member to narrow the slot c. Provision may also be made for shortening the length of the slot, so as to enable narrow bags or other devices to be securely held, and this may be accomplished as shown in Figs. 6, 7, 8, and 9.

Referring to Fig. 6, the arm d of the holding member has secured to it a metal piece p, having an arm q, which extends across the slot c, said arm having, as shown, a finger r, (see Figs. 8 and 9,) which extends down into the slot c. The arm q constitutes a movable end wall for the slot, and the arm d of the holding device is provided with a series of holes s for the reception of the screw t, by means of which the movable end wall or arm q may be secured in different positions to shorten or lengthen the slot c. Provision may also be made for securing the locking member in its closed position, and this may be accomplished in a number of ways, one of which is herein shown. For this purpose the arm h of the locking member is provided with a projection 10, having a hole or opening 12, which is adapted to register with a hole or opening 13 in the arm e of the holding member when the locking member is in its closed position (shown in Figs. 1, 2, and 3) and through which a wire 14 or other sealing device may be passed.

I have herein represented the fastener or holding device as made from sheet metal; but I do not desire to limit my invention in this respect, as it may be made of any suitable material.

I claim—

1. In a device of the character described, in combination, a holding member consisting of a plate or bar provided with a slot open at one end to form arms, and into which slot the bag or other article is inserted, and a locking member pivoted to one of said arms and movable thereon to close said slot, and means on said locking member to engage the other of said arms to prevent said slotted member from spreading, substantially as described.

2. In a device of the character described, in combination, a holding member provided with a slot open at one end to form arms, one of said arms having an upturned portion, and a locking member pivoted to the other of said arms and having a finger to engage the upturned portion of the first-mentioned arm, substantially as described.

3. In a device of the character described, in combination, a holding member provided with a slot, means to vary the width of said slot, and means extended across the slot to confine the article against movement longitudinally in said slot, substantially as described.

4. In a device of the character described, in combination, a holding member provided with a slot open at one end to form arms, one of said arms having an upturned portion provided with a slot in its outer edge, and a locking member pivoted to the other of said arms and having a finger to enter the slot on the edge of said upturned portion and engage the latter, substantially as described.

5. In a device of the character described, in combination, a holding member provided with a slot in which the article to be held is inserted, means to vary the slot in one dimension, and means extended across the slot to confine the article against longitudinal movement in said slot.

6. In a device of the character described, in combination, a holding member provided with a slot open at one end to form arms, one of said arms having an upturned portion, a locking member pivoted to said holding member and comprising an elbow-lever having one arm adapted to extend across the slot to close the same, said lever-arm having a finger to engage the upturned portion of the other arm of the holding member, and having a notch to register with the said slot, substantially as described.

In testimony whereof I have signed my name to this specification in the presence of two subscribing witnesses.

GUSTAF A. DANIELSON.

Witnesses:
JAS. H. CHURCHILL,
J. MURPHY.